UNITED STATES PATENT OFFICE.

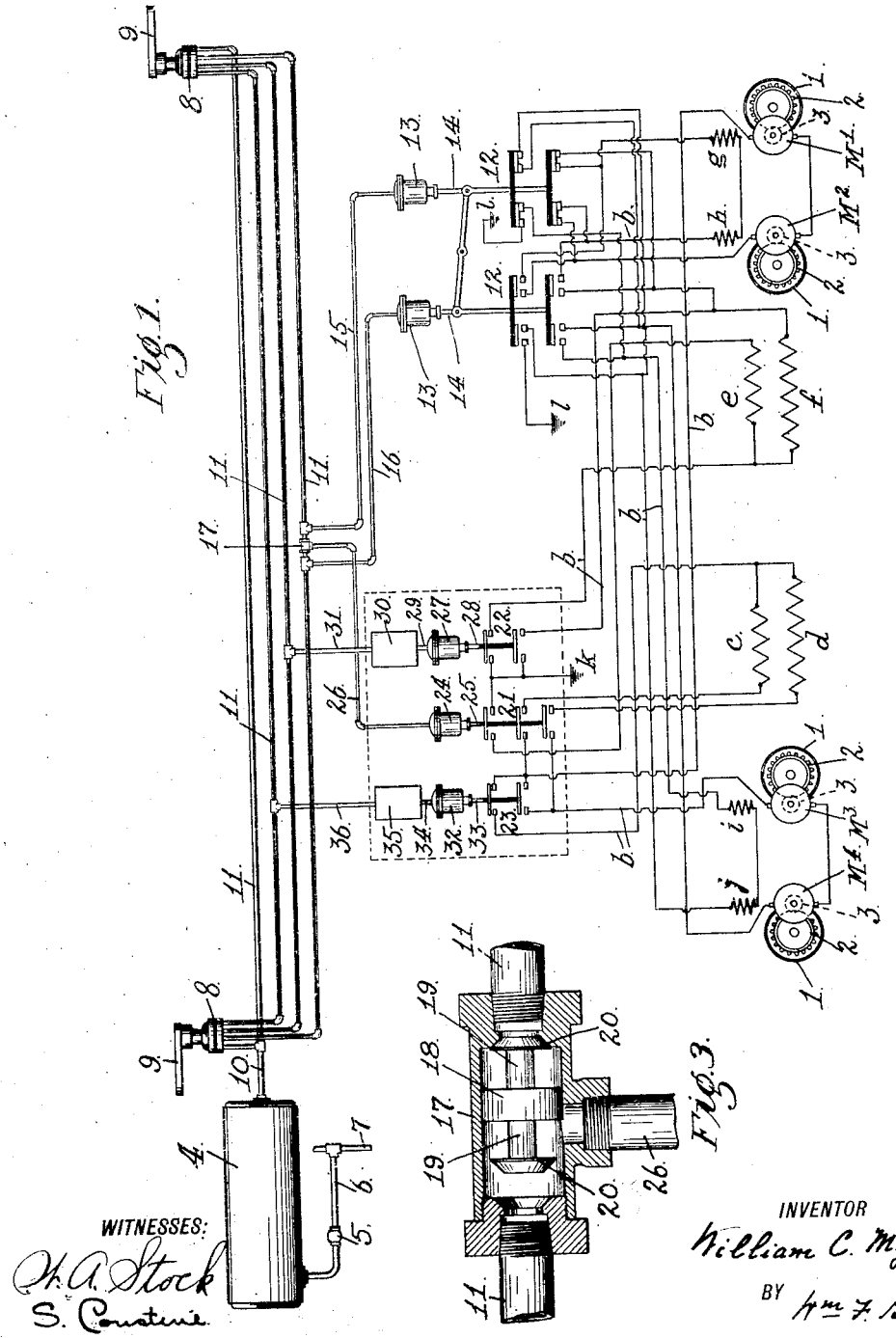

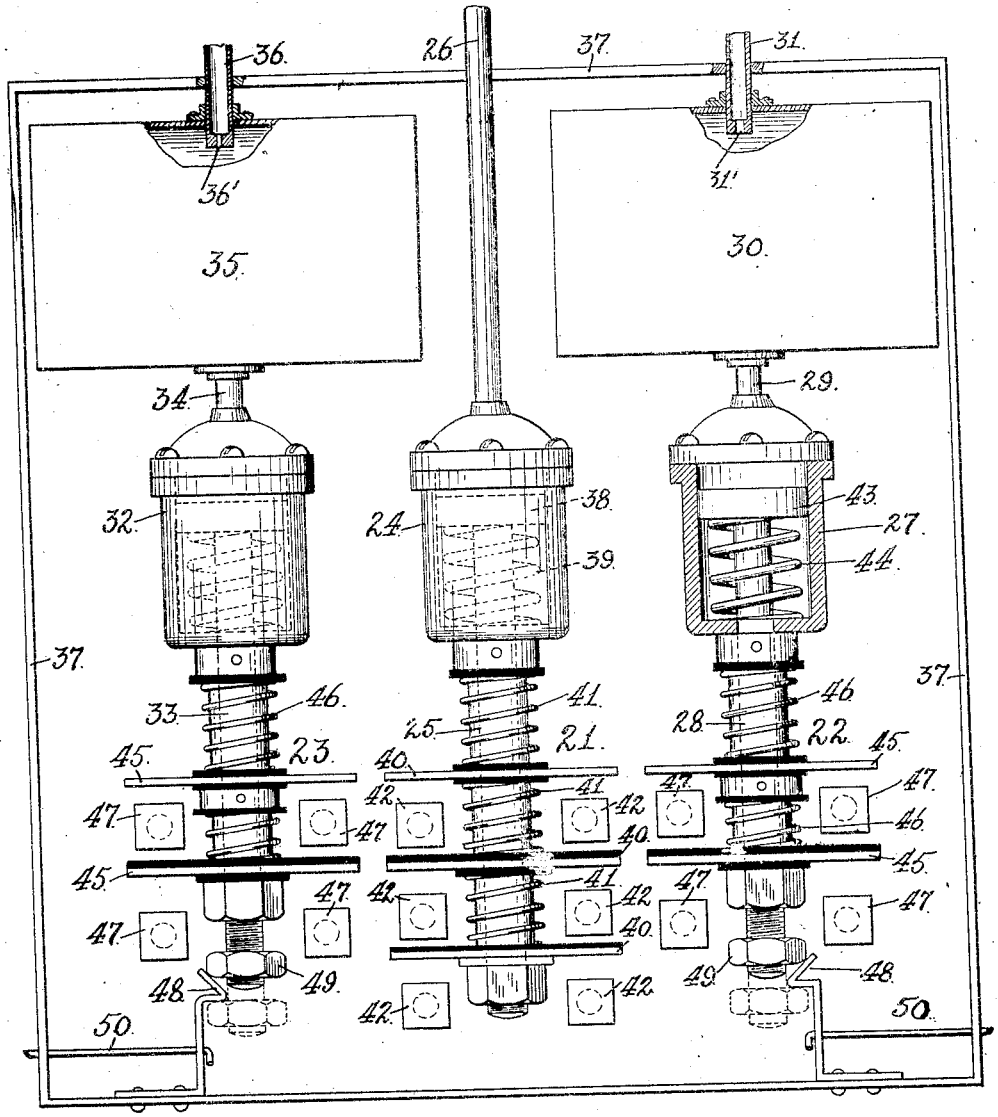

WILLIAM C. MYERS, OF OAKLAND, CALIFORNIA.

ELECTROPNEUMATIC BRAKING SYSTEM.

1,081,550.  Specification of Letters Patent.  Patented Dec. 16, 1913.

Application filed May 22, 1913. Serial No. 769,331.

*To all whom it may concern:*

Be it known that I, WILLIAM C. MYERS, a citizen of the United States, residing at Oakland, in the county of Alameda and State of California, have invented certain new and useful Improvements in Electropneumatic Braking Systems, of which the following is a specification.

My invention relates to emergency braking systems for electric motor cars. It is especially adapted for cars fitted with multiple unit control.

Ever since electric cars have been run it has been known that the motors could be used to stop the car in the event of failure of power from the supply, provided the connections to the motors were made so that if supplied with power they would propel the car in the opposite direction from that in which the car is supposed to be running when it is desired to stop. In the old and original simple multiple connection of motors operated by a rheostat, the operation was merely to throw the reverse switch lever, the braking action beginning automatically and independent of any further action on the part of the motorman. This method has been used as an emergency braking device from the beginning of the art down to the period when the so-called series-parallel control was developed, particularly of the multiple unit type, where a number of cars, operated in a train, are controlled from one platform of that train. With the introduction of the multiple unit control of more recent years where independent switches effect the necessary combinations of motors, and they themselves are controlled by secondary circuits in the hands of the motorman, the old original practice of what was commonly known as "slugging" the motor was no longer possible when power to actuate these contactors or main switches was not available. This, and the introduction of more powerful and expensive air braking apparatus on electric cars has diminished, if not entirely in most cases prevented, the practice of slugging in emergencies. But, latterly, on account of the desirability of single car operation, even when said cars are fitted with multiple unit control, it has become important to develop an emergency braking apparatus or system, other than an auxiliary of the air brakes, and more particularly, independent in every way of mechanical connection between the braking system and the car wheels.

To this end my invention directs itself; and it consists in the novel electro-pneumatic braking system which I shall now fully describe by reference to the accompanying drawings, in which—

Figure 1 is a general diagrammatic view of my system. Fig. 2 is a view showing the details of the electric switches and their air-actuated instrumentalities. Fig. 3 is a detail view of the double check-valve 17, showing its environment.

1 are the car-wheels, 2 the gears, and 3 the pinions. The motors are designated by $M^1$, $M^2$, $M^3$ and $M^4$.

4 is an air-supply reservoir which, under the control of a check valve 5, in the connection 6 from the main supply air-pipe 7, is adapted to contain air under pressure available at all times.

8 are two air-valves, one of which is to be at each end of the car, and 9 are the handles to operate said valves. With one of the air valves, the air-supply reservoir 4 communicates by a pipe 10, and the two air valves are in communication through the four pipes 11.

12 is a polarity switch.

13 are two cylinders, the piston rods 14 of which operate the polarity switch. One of these cylinders communicates by a pipe 15 with one of the inter-valve pipes 11, and the other of said cylinders communicates with said inter-valve pipe through a pipe 16. In said inter-valve pipe 11, between the connections therewith of the pipes 15 and 16, is a double-check valve 17, which, as shown in Fig. 3, comprises an internal piston 18 with oppositely extending stems 19 each of which carries a valve 20 adapted to close and open alternately the air communications from either air-valve to the polarity-switch-operating cylinders 13.

21 is a first electric-switch having three simultaneously operating contacts or terminals. 22 is a second electric-switch having two successively operating contacts or terminals. 23 is a third electric-switch similar to switch 22 with two successively operating contacts or terminals. The details of these switches will be described later on by reference to Fig. 2.

24 is a first-position cylinder, the piston rod 25 of which is adapted to operate the first electric-switch 21. This cylinder is connected by a pipe 26 with the double check valve 17.

27 is a second-position cylinder, the piston rod 28 of which is adapted to operate the second electric-switch 22. This cylinder is supplied by a pipe 29 which issues from an equalizing-reservoir 30. Into this reservoir is admitted an air supply pipe 31 having an orifice 31' of restricted capacity, as seen in Fig. 2, said supply pipe 31 communicating at its other end with a second inter-valve pipe 11.

32 is a third-position cylinder, the piston rod 33 of which is adapted to operate the third electric-switch 23, said cylinder being supplied by a pipe 34 leading from an equalizing-reservoir 35. Into this reservoir is admitted an air-supply pipe 36 having an orifice 36' of a capacity still more restricted, as shown in Fig. 2, than the capacity of the orifice 31' of the air supply pipe 31 leading into the equalizing-reservoir 30 of the second position cylinder 27. The air-supply pipe 36 communicates at its other end with a third inter-valve pipe 11.

The circuits through the first, second and third switches, the motors and the polarity switch are $b$. In the circuits $b$ are the several resistances $c$, $d$, $e$, and $f$, and the fields $g$, $h$, $i$, and $j$. The grounds are at $k$ and $l$. If we suppose the first switch 21 to be closed and the second and third switches 22 and 23 to be open, the circuit is from the ground at $k$ to the uppermost contact of the first switch; thence through the resistance $e$, thence through the resistance $f$, and thence to the polarity switch 12; thence from said polarity switch, through the fields $g$ and $h$ and back to the polarity switch; thence out of said switch to the second motor $M^2$; thence to the first motor $M^1$, and from said first motor to the second contact of the first switch 21; thence through the resistance $c$ and through the resistance $d$ and back to the third contact of the first switch; thence to the third motor $M^3$, and to the fourth motor $M^4$; thence from the latter motor to the polarity switch, and back from said switch to and through the fields $j$ and $i$ and to the polarity switch again and finally to the ground $l$. Now if we suppose the upper contact of the second switch 22 to be later closed, while the first switch still remains closed, it will be seen that resistance $e$ will be cut out; and similarly if still later the lower contact of the second switch 22 be closed, the resistance $f$ will be cut out. In like manner by the still later successive closing of the upper and lower contacts of the third switch 23, the resistances $c$ and $d$ will be successively cut out.

Before describing the operation and effect of this system, I shall point out by reference to Fig. 2, some of the mechanical details of the switches.

The three switches 21, 22 and 23 together with their operating fluid-cylinders 24, 27 and 32 are best housed in a switch box 37, the cylinder 24 and its switch 21 being shown as disposed between the other cylinders and switches. The piston 38 of said cylinder 24 is normally held up by a spring 39 as indicated. The piston rod 25 of this cylinder carries the three contact disks 40 in vertical series each yieldingly mounted and controlled by springs 41. The disks 40 are adapted to move to and from the contact studs 42, and the arrangement is such that all contacts are made and broken simultaneously. The piston 43 of the second position-cylinder 27 is likewise held up by a spring 44, and its rod 28 carries two contact disks 45, each yieldingly mounted and controlled by springs 46. The contact disks 45 make and break connection with fixed contact studs 47, but the relative arrangement of the disks and studs is such that the upper disk reaches its contact at a time prior to the time at which the lower disk reaches its contact. By a similar relative arrangement, which needs no repetition, the contacts of the third switch 23 operate successively. The piston rods of the second and third position cylinders are held down at their lowest positions by the automatically operating spring latches 48 adapted to engage nuts 49 on the lower ends of said rods, said latches being released by the rods 50.

The operation may now be described. A sufficient supply of air is carried in the supply-reservoir 4, which air is available at all times, owing to the check-valve 5. When it is desired to apply the brake, the air is admitted to the system by opening the air valve 8 at either end of the car. The operating cylinders 13 of the polarity switch 12 and the first-position cylinder 24 of the first electric-switch 21 are connected in parallel in the air line, and these connections are such that by reason of the double check valve 17, the polarity switch 12 is reversed from either end of the car regardless of any knowledge on the part of the operator of the then position of said switch. When the air is thus admitted simultaneously to either one of the operating cylinders 13 of the polarity switch 12 and to the first position cylinder 24 of the first electric-switch 21, the said polarity-switch and the said first electric-switch are operated to make the electric connections to the motors required to cause one or more of them to generate current, while the others act as motors. This results in a double retarding force on the car, one force being direct and due to the reversed action of that motor or motors acting as such, and the other force being indirect and due to the conversion of the momentum of the car into energy causing the other motors to generate current. Now, further, in order that the braking power thus obtained may be automatically controlled, notwithstanding the decreasing momentum of the car, resistances, as indicated at $c$, $d$, $e$, and $f$, are inserted in the circuit, and these resistances are controlled by the second and third position cylinders 27 and 32, acting through the second and third electric-switches 22 and 23, which successively cut out said resistances. The automatic action of these cylinders is accomplished by the equalizing reservoirs 30 and 35. The equalizing reservoir 30 of the second position cylinder 27 is supplied as I have before stated by an orifice of sufficient area to allow for the required time in equalizing the pressure before operating the piston in said cylinder. The third-position cylinder 32 is controlled similarly, its equalizing reservoir 35 being supplied by a still smaller orifice which requires more time for equalization.

I claim:—

1. An electro-pneumatic braking system comprising electric motors; a supply reservoir for air under pressure; a polarity-switch; an electric-switch; electric-circuits including said motors, polarity-switch and electric-switch; an air-actuated instrumentality for operating said polarity-switch; a separate air-actuated instrumentality for operating the electric-switch; an air connection leading from the supply-reservoir; operator's valves at separated points in said connection; separate branch connections leading from said air-connection, at points intermediate said valves, to said instrumentalities; and means automatically controlling the communication of the branch connections with said air connection from either operator's valve.

2. An electro-pneumatic braking system comprising electric motors; a supply-reservoir for air under pressure; a polarity-switch; an electric-switch; electric circuits including said motors, polarity-switch and electric-switch; a pair of air-actuated instrumentalities each adapted to operate the polarity-switch; a separate air-actuated instrumentality for operating the electric-switch; an air connection leading from the supply-reservoir; operator's valves at separated points in said connection; a pair of branch connections each leading from said air-connection, at points intermediate said valves, to the air-actuated instrumentalities of the polarity switch; a double-check valve in said air connection between the communications therewith of the said pair of branch connections; and a branch connection from said valve to operate the air-actuated instrumentality of the electric-switch.

3. An electro-pneumatic braking system comprising electric motors; a supply-reservoir for air under pressure; a polarity-switch; an electric-switch; electric-circuits including said motors, polarity-switch and electric-switch; air-actuated instrumentalities for operating said polarity-switch and electric-switch; air connections from the air-supply reservoir to operate said instrumentalities; an operator's valve to control said connections, and means for automatically controlling the voltage and current during the braking operation.

4. An electro-pneumatic braking system comprising electric-motors; a supply-reservoir for air under pressure; a polarity-switch; an electric-switch; electric-circuits including said motors, polarity-switch and electric-switch; said circuits having a resistance therein; air-actuated instrumentalities for operating said polarity-switch and electric-switch; air connections from the air-supply reservoir to operate said instrumentalities; an operator's valve to control said connections; and means for automatically cutting out the resistance in the electric circuits during the braking operation.

5. An electro-pneumatic braking system comprising electric-motors; a supply-reservoir for air under pressure; a polarity-switch; an electric-switch; electric-circuits including said motors, polarity-switch and electric-switch; said circuits having a plurality of resistances therein; air-actuated instrumentalities for operating said polarity-switch and electric-switch; air connections from the air-supply reservoir to operate said instrumentalities; an operator's valve to control said connections; and means for automatically successively cutting out the resistances in the electric circuits during the braking operation.

6. An electro-pneumatic braking system comprising electric-motors; a supply-reservoir for air under pressure; a polarity-switch; an electric-switch; electric-circuits including said motors, polarity-switch and electric switch, said circuits having a resistance therein; air-actuated instrumentalities for operating said polarity-switch and electric-switch; air connections from the air-supply reservoir to operate said instrumentalities; an operator's valve to control said connections; a second electric-switch; an electric circuit controlled by said second switch to cut out the resistance in the first named circuits; an air-actuated instrumentality to operate said second switch; and an air-connection from the first named air connections automatically operative to delay the action of the second switch.

7. An electric-pneumatic braking system comprising electric-motors; a supply-reservoir for air under pressure; a polarity-switch; an electric-switch; electric-circuits including said motors, polarity-switch and electric-switch; said circuits having a resistance therein; air-actuated instrumentalities for operating said polarity-switch and electric-switch; air connection from the air-supply reservoir to operate said instrumentalities; an operator's valve to control said connections; a second electric-switch; an electric circuit controlled by said second switch to cut out the resistance in the first named circuits; an air-actuated instrumentality to operate said second switch; and an air-connection from the first named air connections having included in it an equalizing reservoir automatically operative to delay the action of the second switch.

8. An electro-pneumatic braking system comprising electric-motors; a supply-reservoir for air under pressure; a polarity switch; an electric-switch having a plurality of simultaneously contacting terminals; electric circuits including said motors, polarity-switch and electric-switch, said circuits having a plurality of resistances therein; air-actuated instrumentalities for operating said polarity-switch and electric-switch; air connections from the air supply reservoir to operate said instrumentalities; an operator's valve to control said connections; a second electric-switch having a plurality of successively contacting terminals; electric circuits controlled by said second switch to successively cut out the resistances in the first named circuits; an air-actuated instrumentality to operate said second switch; an air connection from the first named air connections to operate said instrumentality; and an equalizing reservoir in the second named air connection automatically operative to delay the action of said second switch.

In testimony whereof I have signed my name to this specification in the presence of two subscribing witnesses.

WILLIAM C. MYERS.

Witnesses:
Wm. F. Booth,
D. B. Richards.